July 27, 1965    E. KEZNICKL    3,196,769
CAMERA HAVING A VARIFOCAL OBJECTIVE
Filed June 6, 1961    2 Sheets-Sheet 1

Inventor
Eduard Keznickl
by Bennett Montague
Attorney

July 27, 1965 E. KEZNICKL 3,196,769
CAMERA HAVING A VARIFOCAL OBJECTIVE
Filed June 6, 1961 2 Sheets-Sheet 2

— Patented July 27, 1965

1

3,196,769
CAMERA HAVING A VARIFOCAL OBJECTIVE
Eduard Keznickl, Vienna, Austria, assignor to
Karl Vockenhuber, Vienna, Austria
Filed June 6, 1961, Ser. No. 115,108
Claims priority, application Austria, June 15, 1960,
A 4,567/60
3 Claims. (Cl. 95—11)

The present invention relates to a camera, particularly a substandard film camera comprising a varifocal objective, which is at least partly immerged in the camera casing.

Quite generally, it is one object of the present invention to provide a new and improved arrangement of that type of film camera.

There arise difficulties with cameras of that kind insofar, as for one thing the objective has a considerable weight because of the complicated optical and mechanical construction, and for another, it has a relatively long focal length in its end position. Owing to the heavy weight and considerable total length of objectives of that kind, the same exert an essential influence on the position of the total center of gravity of the camera.

In the event of the objective being arranged on the front plate of the camera, a heavy pitching moment occurs leading to a picture unsteadiness. This is insofar especially disturbing, as objectives of variable focal length generally show a maximum focal length being approximately three to four times as large as the normal focal length. Owing to the thereby given small object angle, an unsteadiness by relatively small angles results in an already considerable lack of definition of the picture.

It is, therefore, the main object of the present invention to arrange the objective in cameras comprising objectives of variable focal length in such a manner to preclude, if possible, a pitching moment, and that the center of gravity is located, if possible, within the range of the supporting hand.

A further object of the present invention is the arrangement of the rotatable handle which is meant for adjusting the focal length of the objective in such a way that the hand holding this handle can support the camera as safely as possible.

Still another object of the present invention is the arrangement of the rotatable handle which is meant for focussing the objective in such a way that the hand holding this handle can support the camera as safely as possible.

It is yet another object of the present invention to form the camera in such a way that, when filming without a tripod, on operating the release key which is provided on the camera front plate, no pitching moment occurs which leads to a lack of definition of the picture.

With these and other objects in view, which will become apparent in the following detailed description, the present invention will be clearly understood in connection with the accompanying drawings, in which.

Figure 1:
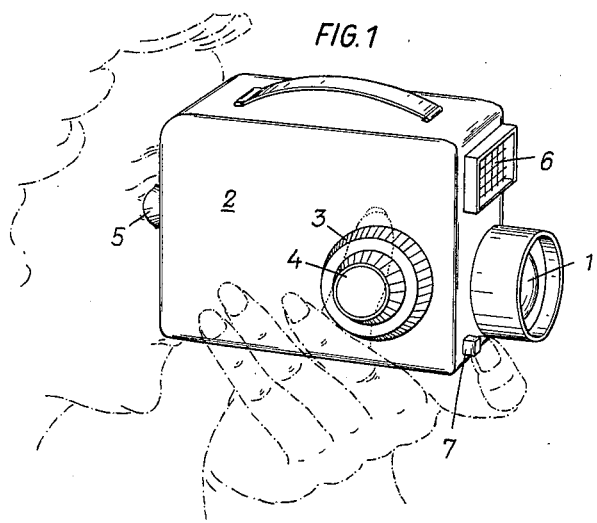
FIGURE 1 is a graphic perspective view of the camera designed in accordance with the present invention.

Referring now to the drawings, an 8 mm. camera, which has an electric-motor-drive and a fully automatic diaphragm control is illustrated, wherein especially FIG. 1 signifies the safe support of the camera when shooting, the camera being supported by hand only. The varifocal objective 1 is mounted immerged within the camera casing 2, and in particular underneath an imaginary horizontal central plane of the casing 2. For the adjustment of the focal length an adjusting knob 3 for the objective focal length is provided within the range of the user's right hand on the appropriate longitudinal side of the casing 2. The knob 4 which is concentrically arranged to the adjusting knob 3 serves the purpose of focussing the objective 1. The construction and mode of operation of the adjusting devices for focal length and distance is described in detail in my copending patent application Serial No. 95,980 filed March 5, 1961. The focussing and the selected frame can be controlled by a mirror reflection finder including an eyecup 5. A photoelectric cell 6 provided with a limitation of the angle of view and energizing the diaphragm control of the camera. A release key 7 is further provided on the front plate of the camera casing 2. The shown camera is constructed in such a way, that it is resting in the left hand of the user during shooting and is supported against the forehead in diagonal direction, the viewfinder ocular 5 being in front of the eye. The right hand holds the two concentric adjusting knobs, the axis of which passes approximately through the center of gravity of the camera, thus also being able to contribute to the additional camera support. As the diaphragm aperture of the camera is automatically controlled, the right hand is able to hold the two adjusting knobs 3 and 4 during filming, thus supporting the camera.

Figure 3:
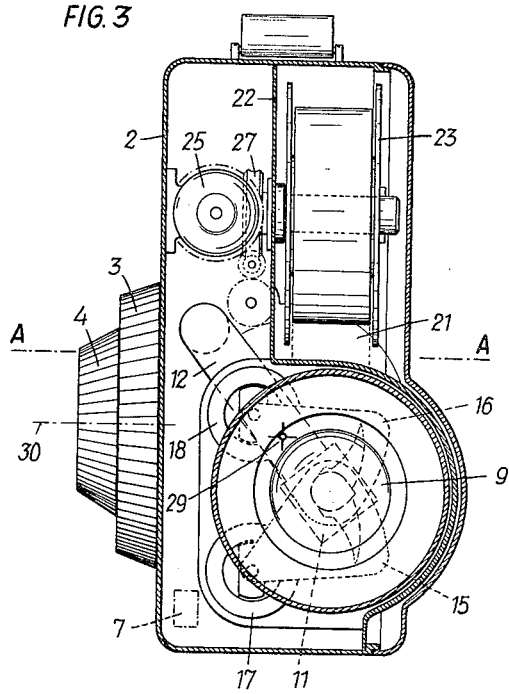
FIG. 3 is a section along the lines 3—3 of FIG. 2.
Figure 2:
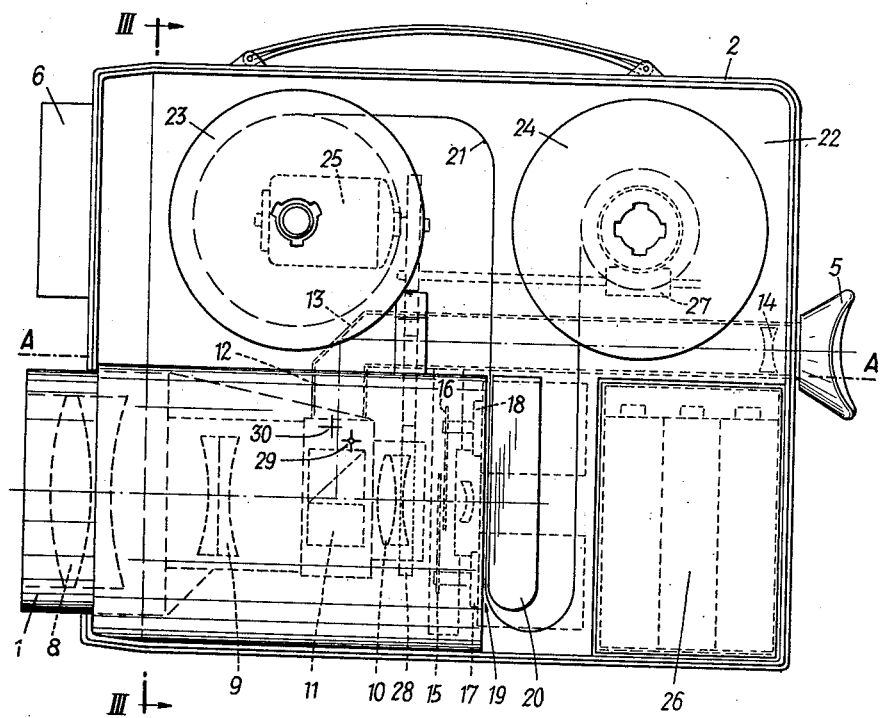
FIG. 2 is a side elevation of the camera, the cover being removed for purpose of better demonstration.

FIGS. 2 and 3 clearly show the horizontal formation of the camera construction, the horizontal central plane being designated by A. Underneath this plane the varifocal objective and its mount are arranged. The objective 1 has three members, of which the positive front member 8 and the negative central member 9 are movable in the direction of the optical axis. The control of this movement of these two members is effected as a function of the focal length adjustment, the negative member 9 being moved linear to the alteration of the focal length, and the front member 8 exercising in the main, an hyperbolic motion with a reversal point. Between the central member 9 and the rear member 10 a partly reflecting prism 11 is provided which is reflecting a portion of the light falling through the objective to a view-finder track 12. The picture as projected by the objective can be examined over a mirror 13 and the viewfinder ocular 14. During filming the eyecup 5 reduces the light falling in the viewfinder track 12. The rear member 10 is constructed of several lenses, between which the objective diaphragm is arranged. This objective diaphragm has two rotatable blades 15, 16 which are rotated each by one moving coil system 17, respectively 18. The coils of the two moving coil instruments 17, 18 are energized by the current of the photoelectric cell 6 and rotate the diaphragm blades in such a way, that the resulting diaphragm aperture corresponds with the light impinging on the photoelectric cell 6.

Next to the varifocal objective 1 is disposed the shutter blade (not shown), as well as the film channel 19 with the film presser 20. The film 21 is drawn off from the feed reel 23 which is rotatably secured to the plate 22, and led to the film channel 19 which is arranged in the lower half of the camera in form of a U-shaped loop, and wound up on the take-up reel 24 after exposure.

The drive of the film results from the electric motor 25 which is energized by the battery 26 which is disposed in the lower half of the camera behind the objective 1 and the diaphragm control 17 and 18. The take-up reel 24 is rotated by the driving motor over a worm drive 27 under the intermediary of a slipper clutch (not shown). The gear for driving the film feed claw and the shutter blade is schematically illustrated and designated by 28.

The drawing shows very clearly the aim of centralizing all the heavy elements of the camera in the lower half of the camera. Whereas above the central plane A of the camera only the two film spools, the driving motor as well as a few light gear elements are provided, in the lower half of the camera the verifocal objective 1 together with its mount and adjusting device, the diaphragm control mechanism with two moving coil meter devices, the batteries, the film feed device, the shutter, and the film channel with its presser are arranged. The total center of gravity 29 of the camera is therefore located on the lower half of the camera, and in particular in very close proximity to the common axis 30 of the two adjusting knobs 3 and 4.

By means of such arrangement, it is possible, when filming, to support the camera in the range of the center of gravity both with the left and with the right hand continuously, i.e., even during the adjustment of focal length and distance, resulting in a particularly smooth camera operation which is, especially when filming with long focal length, a condition for success of the operation.

The present invention is not restricted to the illustrated example, but may be subjected to numerous variations. It is, e.g., possible that the optical axis of the objective is turned through 90 degrees upward by the intermediary of a mirror, respectively, of a prism after the two movable objective members. With this arrangement the film gate and the claw are located in the upper half of the camera, the rear member of the objective being at least partly arranged between the spools.

While I have disclosed one embodiment of the present invention, it is to be understood that this embodiment is given by example only and not in a limiting sense, the scope of the present invention being determined by the claims.

I claim:
1. A camera comprising
   a camera casing having a back wall, a front wall, and a bottom wall,
   a verifocal objective including a plurality of lenses defining an optical axis,
   said objective being mounted partly immerged in said camera casing,
   two film spools disposed one behind the other in the upper portion of said camera casing,
   a viewfinder ocular disposed at about the center of said back wall,
   said back wall of said casing being adapted to be engaged by the forehead of a person looking through said viewfinder ocular and to provide a supporting surface for said person's face,
   said verifocal objective being disposed adjacent said bottom wall of said camera casing, in order to provide a low center of gravity,
   a release key disposed on said front wall of said camera casing,
   said release key and said supporting surface being disposed in an imaginary line passing substantially through said center of gravity of said camera, and
   the operative movement of said release key being substantially in the direction of a face-contacting point of said back wall and toward said center of gravity.
2. The camera, as set forth in claim 1, which includes a film channel disposed behind said objective, and
   a power source means disposed between said spools and said bottom wall and behind said film channel.
3. The camera, as set forth in claim 1, which includes a first and a second rotatable adjusting means for the focal length of and for focusing said objective,
   the rotating axis of said adjusting means being horizontal and perpendicular to the optical axis of said objective, as well as extending substantially through said center of gravity.

References Cited by the Examiner
UNITED STATES PATENTS

| | | | |
|---|---|---|---|
| 1,907,437 | 5/33 | Nopper | 95—86 X |
| 2,677,012 | 4/54 | Bach | 352—219 |
| 2,819,647 | 1/58 | Golick et al. | 352—172 |
| 2,933,975 | 4/60 | Taesler | 352—156 |
| 3,062,091 | 11/62 | Akahane | 352—176 |

JOHN M. HORAN, *Primary Examiner.*

JAMES W. LOVE, NORTON ANSHER, *Examiners.*